R. E. WHITE.
FROG TRAP.
APPLICATION FILED AUG. 10, 1911.
1,007,758.
Patented Nov. 7, 1911.
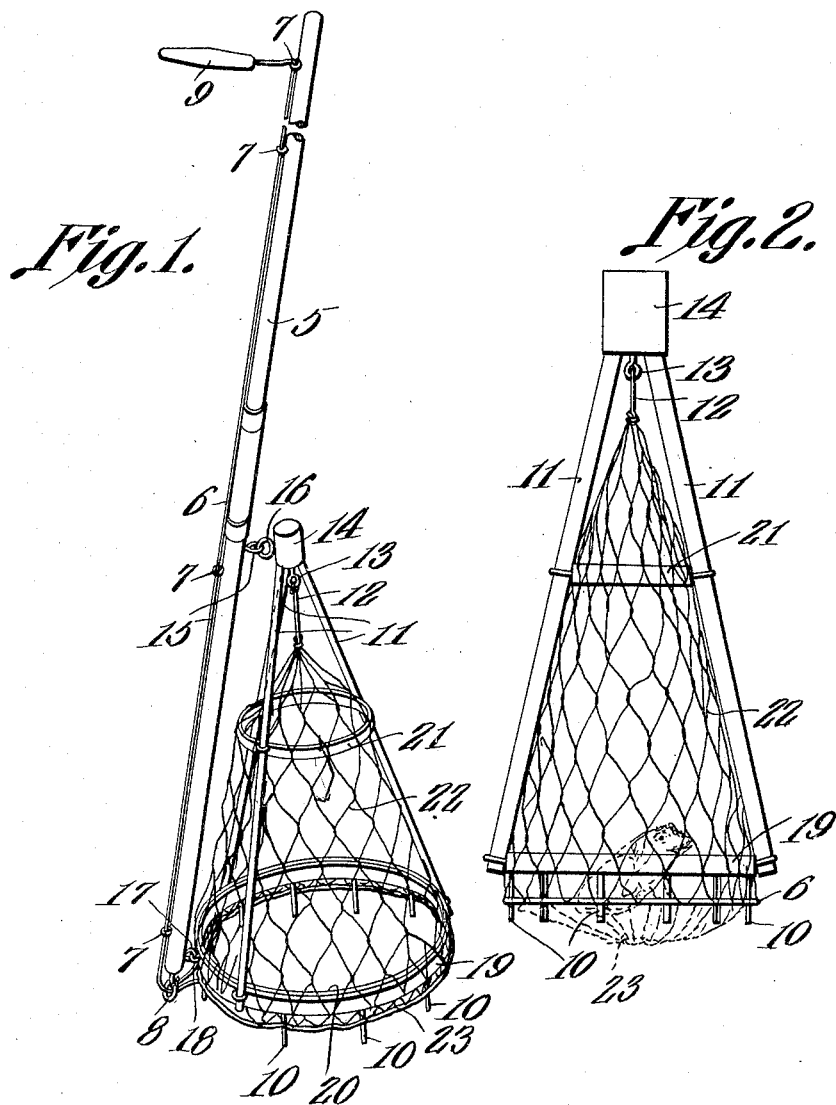
Witnesses
Robert E. White,
Inventor
by C. A. Snow & Co.
Attorneys

UNITED STATES PATENT OFFICE.

ROBERT E. WHITE, OF MOUNT STERLING, KENTUCKY.

FROG-TRAP.

1,007,758.  Specification of Letters Patent.  Patented Nov. 7, 1911.

Application filed August 10, 1911. Serial No. 643,414.

*To all whom it may concern:*

Be it known that I, ROBERT E. WHITE, a citizen of the United States, residing at Mount Sterling, in the county of Montgomery and State of Kentucky, have invented a new and useful Frog-Trap, of which the following is a specification.

This invention relates to traps for catching frogs, or other animals and reptiles, and has for its primary object to provide an improved trap of this character which is simple in construction and manipulation and is effective in its use.

Further objects relating to the construction and arrangement of the various parts of the trap will be evident from the hereinafter description.

This invention is embodied essentially in an inverted bag of meshed material mounted at the bottom of a suitable pole or rod, and means for closing the mouth of the bag from the upper end of the pole.

This invention is illustrated in the accompanying drawings, in which similar reference characters indicate similar parts, and in which—

Figure 1 is a perspective view of the trap. Fig. 2 is an elevation of the meshed bag and accompanying parts and frame.

Referring in detail to the drawings, 5 designates a pole or rod of suitable character, which is preferably made in sections, such as is common in fishing poles. The inverted meshed bag is indicated at 22, being conical in form. This bag is held in position by a suitable frame comprising braces 11 diverging from an upper head 14 and having secured therebetween at their intermediate portions the horizontally disposed ring 21 and at the lower ends thereof the horizontally disposed ring 19 which is of corresponding larger diameter than the ring 21. The lower end of the bag 22 is secured in any convenient manner to the ring 19 and at its intermediate portion over the ring 21, and the apex thereof is secured by a cord 12 to the block 14 by means of an eye-screw 13 secured in the bottom of the said head or block. A ring 20 sets within the ring 19 and between the said rings are disposed a series of flexible fingers 10 depending therefrom. The lower end or mouth of the bag 22 is normally arranged to be held over the outer faces of the fingers 10 to permit the bottom of the said bag to remain open. The bottom of the bag, however, is arranged to be pursed by being drawn off of the lower ends of the fingers 10 in a manner which will be described hereinafter. Upon the lower end of the bag being pursed the same can be conveniently closed to catch the frog or other animal within the bag.

The pole 5 is provided with a series of eyelets 7 spaced along its length and in alinement with each other and on its lower end with an eyelet 8. A cord, string, or other suitable flexible member is passed through the eyelets 7 and through the eyelet 8 and is woven around the strands at the mouth of the bag, being secured at its extremity to the eyelet 8, thus forming a noose passing around the mouth of the bag. This noose is normally held open by being disposed over the fingers 10 with the mouth of the bag. A suitable handle 9 is secured to the upper extremity of the cord 6.

The bag frame is secured to the lower end of the pole 5 by means of an eyelet 16 secured to the head or block 14 and an eyelet 18 secured to the periphery of the ring 19, which eyelets engage corresponding eyelets 15 and 17 on the pole, thus forming a loose connection between the bag frame and the pole. Before proceeding with the operation of the device it may be stated that the fingers 10 can be secured to the ring 19 in any suitable manner and that the bag 22 can be formed of any suitable material or designed in various styles. The bag frame can also be formed in various manners and of various materials, such as bamboo, steel or the like. It is also understood that the various parts can be proportioned according to the use to which the trap may be put, that is, the dimensions and proportions may be altered as deemed necessary, or as desired due to the particular whim of the user.

In using this trap, the mouth of the bag and noose of the cord 6 are first placed or expanded over the flexible fingers 10 as clearly shown in Fig. 1, thus holding the lower end of the bag open. The said bag is then manipulated by the pole 5 which is held by its upper end by the trapper who brings the open end of the bag toward the frog or animal which he is attempting to catch. The frog or other animal during the ruse in its attempt to escape will jump into the bag and the trapper by pulling the cord 6 causes the noose and mouth of the bag to slip over the ends of the flexible fingers which are bent inwardly at their lower ends due to the tension applied to the cord, thus pursing the mouth of the bag and closing the open end of the said bag to trap the animal. After the animal is trapped within the bag it is an easy matter to kill the same or transfer the animal to a suitable container, and the trap may be placed in position for repeated operation.

This trap may also be found useful in catching birds, fish and reptiles, but is particularly adapted for catching frogs and similar hopping animals.

It will be noted that the axis of the conical shaped bag 22 is at an acute angle with respect to the axis of the pole 5 which admits of the advantageous manipulation of the bag.

It is further understood that this invention is susceptible of alteration in its details of construction within the scope of the appended claims without departing from the spirit of the invention.

What is claimed as new is:—

1. A trap comprising a pole, a bag frame secured to one end of the pole, a bag mounted on the said frame, a plurality of flexible fingers projecting from the said frame and over which the open end of the bag is adapted to be arranged to normally hold the same in open position, and a cord having a noose interwoven with the mouth of the bag and extending along the pole, the noose being adapted to surround the said fingers, whereby upon the cord being pulled the noose is caused to slip off of the ends of the fingers to purse the open end of the bag to close same.

2. A trap comprising a pole, a bag frame secured to one end of the pole, a bag mounted on the said frame, a cord extending along the pole and having a noose interwoven with the mouth of the bag, and means for normally holding the noose and mouth of the bag in open position whereby upon the cord being pulled the mouth of the bag is pursed to close same.

3. A trap comprising a pole, a bag frame comprising a head, a ring, and braces between the head and ring, the said head and ring being secured to the lower end of the pole, a conical bag having the apex thereof secured to the said head and the lower end thereof which is open secured to the said ring, a series of flexible fingers depending from the said ring and over which the lower end of the bag is adapted to be arranged to normally hold the same in open position, and a cord secured to the lower end of the pole having a noose interwoven with the lower end of the bag and extending up the pole, the noose being adapted to surround the said fingers, whereby upon the cord being pulled, the noose is caused to slip off of the lower ends of the said fingers to purse the lower end of the bag.

In testimony that I claim the foregoing as my own, I have hereto affixed my signature in the presence of two witnesses.

ROBERT E. WHITE.

Witnesses:
A. A. HAZELRIGG,
W. F. CRAFTS.

Copies of this patent may be obtained for five cents each, by addressing the "Commissioner of Patents, Washington, D. C."